May 12, 1970   K. BLATTNER ET AL   3,511,149
DEVICE FOR PLOTTING OF OBJECT POINTS, LINES AND
SYMBOLS ON A PHOTOGRAPHIC LAYER
Filed May 6, 1968

INVENTOR.
Karl Blattner
BY Roland Picard

Alvin Browdy
Attorney

United States Patent Office 3,511,149
Patented May 12, 1970

3,511,149
DEVICE FOR PLOTTING OF OBJECT POINTS, LINES AND SYMBOLS ON A PHOTOGRAPHIC LAYER
Karl Blattner, Rain 698, Kuttigen, Switzerland, and Roland Picard, Sonnmattstrasse 923, Rombach, Switzerland
Filed May 6, 1968, Ser. No. 726,899
Claims priority, application Switzerland, May 9, 1967, 6,582/67
Int. Cl. G03b 29/00
U.S. Cl. 95—12                    10 Claims

ABSTRACT OF THE DISCLOSURE

A device for plotting points, lines, and symbols on a photographic layer including an operating carriage which moves in a plane not parallel to the photographic layer. Carried by the operating carriage is a photographic objective in two parts, one part being secured to the carriage adjacent a light source and the other being mounted on a vertically adjustable member. Light from the source is relayed by the first objective to a diaphragm or stencil having an aperture therein through which light passes and is focused on the photographic layer by the adjustable objective. The vertically adjustable member is cushioned partially by pressurized air supplied to a nozzle attached thereto and partially by a spring member.

---

Figure 1:
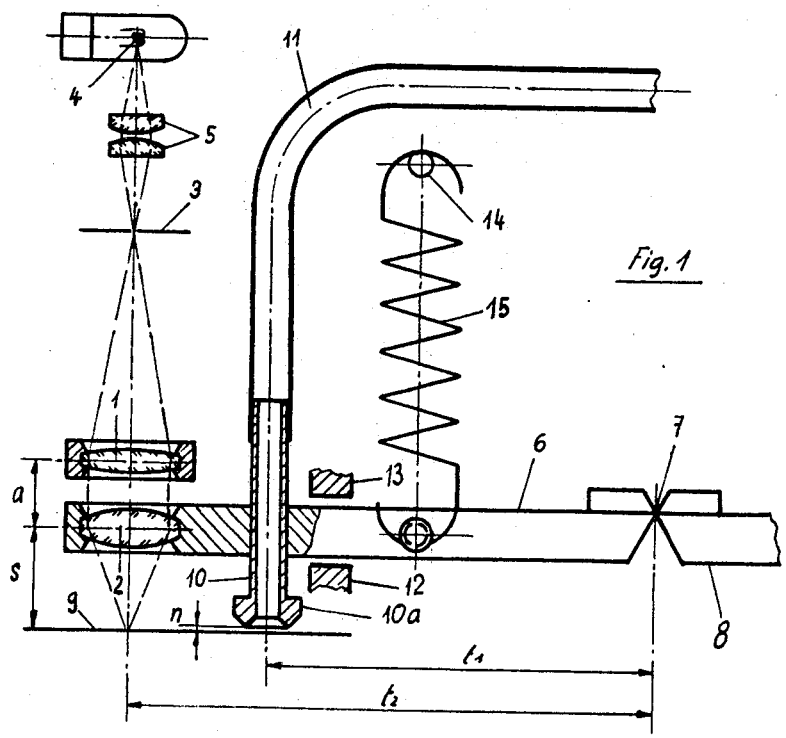

The invention relates to a device for the substantially accurate plotting of object points, lines and symbols on a photographic layer which is not parallel to the guide plane of the operating carriage and/or not plane, for use in drawing machines, coordinatographs or similar apparatus.

In drawing machines, coordinatographs and similar apparatus, for example in automatic apparatus controlled by storage media, such as punched cards, punched tapes, magnetic tapes and the like, and provided with an operating carriage carrying the drawing tool, the image of object points, lines and symbols may be reproduced on a photographic layer applied to a support or a film base or emulsion carrier in the form of a glass plate, a film or the like, without the drawing apparatus contacting the photographic layer, in that the image of the aperture of a diaphragm or stencil secured to the operating carriage is reproduced on the photographic layer provided on the film base or emulsion carrier mounted on the drawing board of the apparatus, by means of a suitable photographic objective, also secured to the operating carriage. As the operating carriage of the apparatus moves in accordance with the control programme, the image of the aperture of the diaphragm follows the movement of the operating carriage and plots a required line on the photographic layer. When the operating carriage is stationary, symbols, for example characters, numbers, or mathematical symbols are plotted on the photographic layer in their totality as an image of the aperture of a stencil. The minimum thickness of stroke of lines and symbols of any kind obtainable by optical drawing apparatus of this kind is determined by several factors, and depends primarily upon the parallelism between the photographic layer and the guide plane of the operating carriage and upon the planeness of the photographic layer, the accuracy with which the guides and bearings of the operating carriage are constructed and machined, and the stability of all parts of the apparatus. These factors, which may be the cause of aberrations are controlled by extraneous influences, particularly those of a thermal nature. It will be appreciated that the relative aperture of the photographic objective used for reproducing the image of the aperture of the diaphragm or of the stencil has therefore to be relatively large in order to enable a light source of minimum output to be used for illuminating the diaphragm or the stencil, since the thermal influence exerted by lamps of this kind upon the photographic layer, the film base or emulsion carrier thereof, and all parts of the apparatus involved, particularly upon the operating carriage and the guides and bearings thereof, causes the minimum error. The aforementioned error-producing factors afford the result that the strokes of the lines and symbols obtainable by means of optical drawing apparatus of this kind have a relatively substantial thickness, even when all parts of the apparatus involved have been constructed and machined with the maximum precision, so that the standards set cannot be met in many cases. In accordance with the invention, this disadvantage is largely avoided.

The invention relates to a device provided in a drawing machine, coordinatograph or similar apparatus for an at least substantially accurate plotting of object points, lines and symbols on a photographic layer which is not parallel to the guide plane of the operating carriage and/ or not plane, in which the image of the aperture of an illuminated diaphragm or stencil secured to the operating carriage of the apparatus is reproduced on the photographic layer by means of a photographic objective also mounted on the operating carriage. In accordance with the invention, the device comprises a photographic objective comprising two parts; the part disposed on the side of the diaphragm or stencil is secured to the operating carriage of the apparatus and reproduces the image of the aperture of the diaphragm or stencil to infinity, whereas the part of the objective disposed on the side of the photographic layer reproduces on the photographic layer the image of the aperture of the diaphragm or stencil produced by the first part of the objective. The second part of the objective is mounted in a vertically adjustable member provided on the operating carriage of the apparatus and containing a vertically adjustable nozzle fed with compressed air of a substantially constant pressure which escapes between the photographic layer and the nozzle tip above it to form an air cushion having a constant thickness at constant pressure of the compressed air and absorbing at least part of the weight of the vertically adjustable member mounted on the operating carriage of the apparatus and carrying the second part of the objective.

By means of this device it is achieved that, when the guides of the operating carriage are not perfectly straight and not perfectly in parallel with the drawing board of the apparatus, that is to say not perfectly parallel to the photographic layer and/or for some reason or other the photographic layer is not perfectly plane, the position of this photographic layer at which the image of the aperture of the diaphragm or stencil is to be reproduced is, with exact adjustment of the nozzle, always disposed with high accuracy in the image plane of the reproducing optical system, so that a perfectly sharp image of the aperture of the diaphragm or stencil is reproduced on the photographic layer as hereinafter described. The strokes of the lines and symbols plotted on the photographic layer as the operating carriage moves, may thus be provided of minimum thickness and with perfectly sharp edges, this being impossible with the hitherto known devices of this kind.

Figure 2:
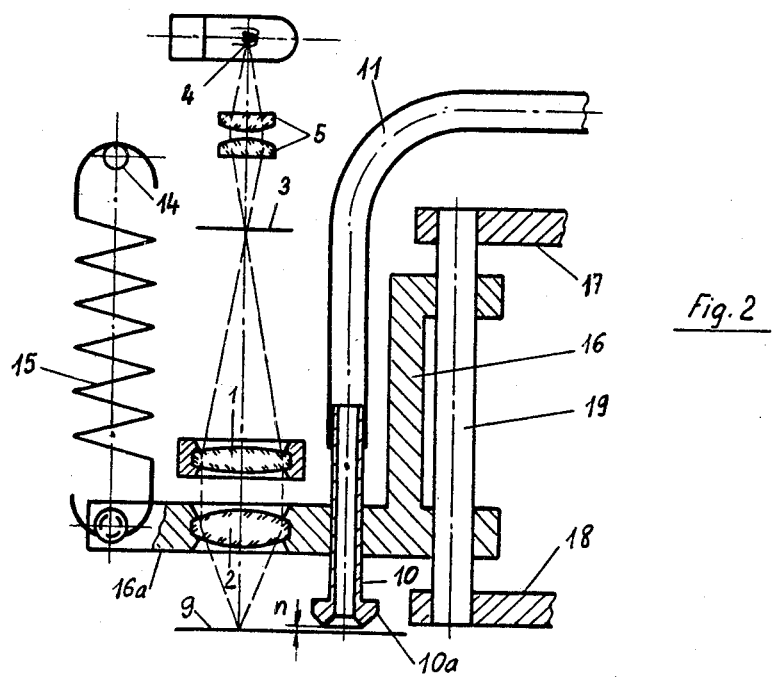

Two embodiments of the device according to the invention provided in a drawing machine, a coordinatograph, or in similar apparatus for at least substantially accurate plotting of object points, lines and symbols on a photographic layer which is not parallel to the guide plane of the operating carriage and/or not plane, are diagrammatically illustrated in the accompanying drawings, in which all parts not essential to the invention are omitted, and in which FIG. 1 is a part-sectional side elevation of a first construction of the device according to the invention, and FIG. 2 is a vertical section through a second construction of the device according to the invention.

The device illustrated in FIG. 1 provided in a drawing machine or similar apparatus for the at least substantially accurate plotting of object points and lines on a photographic layer which is not parallel to the guide plane of the operating carirage of the apparatus and/or not plane, comprises a photographic objective comprising two parts 1 and 2, and a diaphragm 3 which is illuminated by a light source 4 through a condenser 5. Part 1 of the objective, the diaphragm 3, the light source 4 and the condenser 5 are secured to a part of the operating carriage of the apparatus, only a small portion of the operating carriage being shown in the drawings. Part 2 of the objective is inserted in the free end of a rocker 6 which is linked to the operating carriage by a joint, that is a spring joint 7 in the illustrated construction, formed by a leaf spring one end of which is clamped securely in position at the end of the rocker 6 adjacent the joint, its other end being clamped securely in position on a part 8 of the operating carriage. The light source 4, through the condenser 5, illuminates the diaphragm 3 the image of whose aperture is first reproduced to the infinite by part 1 of the objective, and then on the photographic layer 9 of a film base or emulsion carrier provided in the form of a glass plate, a film or a plate capable of being etched mounted on the drawing board of the drawing machine, by part 1 of the objective. Similarly, when the operating carriage is stationary, the aperture of the stencil of a symbol, for example a character, a number, a mathematical symbol, or the like, may be illuminated by the light source 4 and reproduced on the photographic layer 9 by the objective 1, 2. The optical distance between the two parts 1 and 2 of the objective is denoted by $a$, the focal intercept of part 2 of the objective denoted by $s$. The rocker 6 contains a nozzle 10, the lower end of which contains a vertically adjustable nozzle tip 10a extending parallel to the optical axis of part 2 of the objective, the nozzle 10 being connected by a flexible tube 11 to a compressed-air source for supplying compressed air of a substantially constant pressure. In order to simplify the drawing, the nozzle 10 in FIG. 1 is disposed in the image plane between the part 2 of the objective and the spring joint 7; the nozzle 10 is, however, actually disposed as closely as possible to part 2 of the objective, that is to say forwardly of or beyond it in FIG. 1. The distance $t_1$ between the nozzle 10 and the spring joint 7 should correspond substantially to the distance $t_2$ between the optical axis of part 2 of the objective and the spring joint 7. The field of traverse or swing angle of the rocker 6 is limited by two stops 12 and 13 secured to the operating carriage. A tension spring 15, which has a suitable spring characteristic and is secured to part 14 of the operating carriage, its other end engaging the rocker 6, ensures that the weight of the rocker 6 plus the weights of part 2 of the objective and of the nozzles 10, 10a is neutralized except for a residual amount which remains constant with adequate accuracy.

When the apparatus is in operation, the device hereinbefore described operates as follows:

When the photographic layer 9 is perfectly plane and parallel to the guide plane of the operating carriage, the rocker 6 is in its mid-position in which the residual weight not absorbed by the tension spring 15 is supported by an air cushion formed by the compressed air between the nozzle tip 10a and the photographic layer 9, the pressure of the compressed air being substantially constant as it flows from the nozzle tip 10a. At a corresponding pressure of the compressed air, the thickness $n$ of the air cushion amounts to a fraction of a millimetre and remains constant with constant pressure of the effluent compressed air. When the rocker 6 is in this position, the image of the aperture of the diaphragm 3 or of the stencil reproduced by part 2 of the objective is disposed exactly on the photographic layer 9. When the guides on which the operating carriage runs are for some reason or other not perfectly straight and not parallel to the photographic layer 9 and/or when the photographic layer 9 itself is not perfectly plane and parallel to the guide plane of the operating carriage, then the position of the photographic layer 9 at which the image of the aperture of the diaphragm or of the stencil is to be reproduced is moved downwardly or upwardly away from the image plane of part 2 of the objective. Since, however, with adequate stability of the pressure of the compressed air flowing from the nozzle tip 10a, the aforementioned air cushion carrying the residual weight of the rocker 6 can always only have the thickness $n$, the rocker 6 with part 2 of the objective follows automatically and with high precision the variations in the level of the positions of the photographic layer 9 at which the image of the aperture of the diaphragm 3 or of the stencil is to be reproduced, relative to the image plane of part 2 of the objective, so that always a very sharp image of the aperture of the diaphragm 3 or of the stencil is reproduced on the photographic layer 9. In order that this may be achieved with adequate accuracy, the distance $t_1$ between the axis of the nozzle 10 and the spring joint 7 has to correspond substantially to the distance $t_2$ between the optical axis of part 2 of the objective and the spring joint 7, as hereinbefore described. The variation in the distance $a$ between the two parts 1 and 2 of the objective caused by the rotating motion of the rocker 6 is of no importance, since parallel paths of rays obtain between parts 1 and 2 of the objective, inasmuch as part 1 of the objective reproduces the image of the aperture of the diaphragm 3 or of the stencil to the infinite. As the rocker 6 carries out its rotating motion, part 2 of the objective inserted in the rocker 6 moves along a circular arc, so that the image of the diaphragm 3 or of the stencil supplied by part 2 of the objective is deflected from its ideal position in the direction spring joint—part 2 of the objective. However, since part 2 of the objective must move only fractions of a millimetre, this shift of the image is so minute as to be readily acceptable.

Since the air cushion formed by the compressed air flowing from the nozzle tip 10a has to support only a small portion of the weight of the rocker 6, the compressed air may have a relatively low pressure. The compressed air flowing from the nozzle tip 10a and forming the air cushion has the additional advantageous effect of keeping dust away from the surface of the photographic layer 9 on which the image of the aperture of the diaphragm 3 is reproduced. The effluent compressed air also contributes to maintaining the temperature constant, so that the thermal influences to which the device and the apparatus in general are subjected and which are the cause of errors, are considerably reduced.

In the construction illustrated by way of example, parts 1 and 2 of the objective are shown as ordinary lenses. However, extensively corrected lens systems instead of the ordinary lenses may be used.

A light source 4 radiating an at least substantially monochromatic light is advantageously used, so that chromatic aberrations may be substantially avoided from the start.

The device illustrated in FIG. 2, in which the parts corresponding to those shown in the construction illustrated in FIG. 1 are provided with the same reference symbols as in FIG. 1, is intended for cases where higher standards have to be met. This device is also provided with an objective comprising two parts 1 and 2, an apertured diaphragm 3 or a stencil, and a light source 4 which illuminates the diaphragm 3 or the stencil through a condenser. Part 1 of the objective, the diaphragm 3 or the stencil, the light source 4 and the condenser 5 are mounted securely on the operating carriage of the apparatus. However, part 2 of the objective is inserted in an arm 16a of a support 16 which is guided substantially free from play and friction on a column 19 extending at right angles to the drawing board of the apparatus and mounted securely in two bearing brackets 17 and 18 of the operating carriage. A vertically adjustable nozzle 10 having its nozzle tip 10a at its lower end, is inserted in the arm 16a of the support 16. One end of a tension spring 15 engages the arm 16a of the support 16, its other end being secured to part 14 of the operating carriage of the apparatus. As in the device illustrated in FIG. 1, the tension spring 15 absorbs the weight of the support 16, 16a plus the weights of part 2 of the objective and of the nozzle 10, 10a except for a small residual amount.

The operation of the device illustrated in FIG. 2 corresponds essentially to that of the device illustrated in FIG. 1. However, since in the device illustrated in FIG. 2 the support 16, 16a carrying part 2 of the objective is moved at right angles to the drawing board of the apparatus, its displacement does not involve any deflection of the image of the aperture of the diaphragm 3 or of the stencil from its ideal position. Substantially greater differences in level between the photographic layer 9 and the image plane of part 2 of the objective, which differences may amount to up to several millimetres, can thus be accurately equalized.

What we claim is:

1. In a drawing machine, a coordinatograph or similar apparatus, a device for at least substantially accurate plotting of object points, lines and symbols on a photographic layer, which is not parallel to the guide plane of the operating carriage and/or not plane, for reproducing on the photographic layer the image of the aperture of a diaphragm or stencil, secured to the operating carriage of the apparatus, by means of a photographic objective, also mounted on the operating carriage, in which the device comprises a photographic objective comprising two parts (1 and 2), the first part (1) of the objective on the side of the diaphragm or stencil (3) being secured to the operating carriage of the apparatus and reproducing the image of the aperture of the diaphragm or stencil (3) to the infinite, the second part (2) of the objective disposed on the side of the photographic layer and reproducing on the photographic layer the image of the aperture of the diaphragm or stencil (3) produced by the first part (1) of the objective being mounted on a vertically adjustable member (6; 16, 16a) mounted on the operating carriage of the apparatus, a vertically adjustable nozzle (10, 10a) supplied with compressed air of an at least substantially constant pressure, being inserted in said member (6; 16, 16a), the compressed air escaping between the photographic layer (9) and the nozzle tip (10a) disposed above it to form an air cushion whose thickness (n) is constant at constant pressure of the compressed air, the air cushion absorbing at least part of the weight of the vertical adjustable member (6; 16, 16a) mounted on the apparatus and carrying the second part (2) of the objective.

2. A device according to the claim 1, in which one end of a tension spring (15) is secured to a part (14) of the operating carriage of the apparatus, the other end of the tension spring engaging the vertically adjustable member (6; 16, 16a) carrying the second part (2) of the objective, the tension spring absorbing the major part of the weight of said member (6; 16, 16a), so that the air cushion formed by the compressed air flowing from the nozzle tip (10a) has to support only the residual weight of the member 16; 16, 16a).

3. A device according to the claim 1, in which the vertically adjustable member carrying the second part (2) of the objective consists of a rocker (6) which is mounted by means of a joint (7) on a part of the operating carriage of the apparatus, the distance between the axis of the nozzle (10, 10a) and the joint (7) corresponding at least approximately to the distance between the optical axis of the second part (2) of the objective and the joint.

4. A device according to claim 1, in which the vertically adjustable part carrying the second part (2) of the objective consists of sliding support (16, 16a) which is guided on a column (19) extending at right angles to the drawing board of the apparatus and mounted on the operating carriage of the apparatus.

5. A device according to claim 2, in which at least the lower part of the nozzle tip (10a) is of a conical construction.

6. A device according to claim 1, in which the apertured diaphragm or stencil (3) is illuminated by a light source (4) secured to the operating carriage of the apparatus and radiating an at least substantially monochromatic light.

7. A device according to claim 2, in which the vertically adjustable member carrying the second part (2) of the objective consists of a rocker (6) which is mounted by means of a joint (7) on a part of the operating carriage of the apparatus, the distance between the axis of the nozzle (10, 10a) and the joint (7) corresponding at least approximately to the distance between the optical axis of the second part (2) of the objective and the joint.

8. A device according to claim 2, in which the vertically adjustable part carrying the second part (2) of the object consists of a sliding support (16, 16a) which is guided on a column (19) extending at right angles to the drawing board of the apparatus and mounted on the operating carriage of the apparatus.

9. A device according to claim 3, in which at least the lower part of the nozzle tip (10a) is of a conical construction.

10. A device according to claim 7, in which at least the lower part of the nozzle tip (10a) is of a conical construction.

References Cited

UNITED STATES PATENTS

| | | |
|---|---|---|
| 2,959,636 | 11/1960 | Lemelson. |
| 3,004,469 | 10/1961 | Broyer _____ 5—12 |
| 3,307,020 | 2/1967 | Cahill. |
| 3,330,182 | 7/1967 | Gerber et al. _____ 95—12 |

NORTON ANSHER, Primary Examiner

D. J. CLEMENT, Assistant Examiner

U.S. Cl. X.R.

95—1; 355—40